W. J. MOORE.
CORN SHELLER.
APPLICATION FILED JULY 2, 1909.

941,798.

Patented Nov. 30, 1909.

Witnesses
A. H. Rabsag,
O. H. Butler

Inventor
W. J. MOORE,
By H. C. Evert & Co.
Attorneys

UNITED STATES PATENT OFFICE.

WILLIAM J. MOORE, OF EAST PITTSBURG, PENNSYLVANIA.

CORN-SHELLER.

941,798.   Specification of Letters Patent.   Patented Nov. 30, 1909.

Application filed July 2, 1909. Serial No. 505,635.

*To all whom it may concern:*

Be it known that I, WILLIAM J. MOORE, a citizen of the United States of America, residing at East Pittsburg, in the county of Allegheny and State of Pennsylvania, have invented certain new and useful Improvements in Corn-Shellers, of which the following is a specification, reference being had therein to the accompanying drawing.

This invention relates to a corn sheller, and the object of my invention is to provide a novel hand device for expeditiously removing grains of corn from a cob, without injuring the hand. To this end, I have devised a metallic corn sheller, comprising two hinged sections adjustable to ears of corn of various sizes, said hinged sections having inwardly extending projections adapted to engage between the rows of corn and remove the grains of each row.

The detail construction entering into my invention will be hereinafter described and then claimed.

Figure 1:
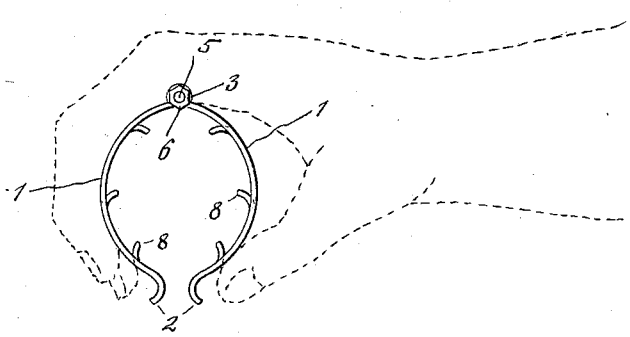
Figure 2:
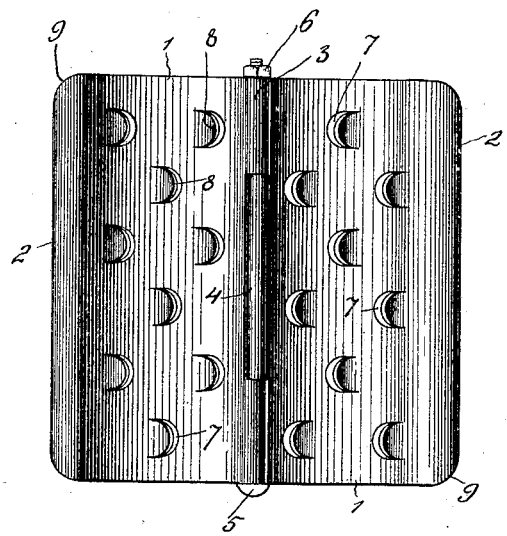

Referring to the drawings:—Figure 1 is an end view of a corn sheller illustrating the manner of gripping the same, and Fig. 2 is an elevation of the sheller in an open position.

In the accompanying drawings, 1 designates two semi-cylindrical metallic sections having longitudinally flared edges 2 and the opposite longitudinal edges cut and bent to provide sleeves 3 and 4, the sleeve 4 fitting between the sleeves 3, whereby the sections can be pivotally connected by a longitudinal bolt 5 and a nut 6 screwed upon the end of said bolt. The sections 1 are cut and pressed, as at 7, to provide a plurality of staggeredly arranged inwardly extending projections 8, said projections in plan being semi-circular.

The longitudinal flared edges 2 of the sheller are rounded, as at 9, at the upper and lower edges of the sheller, to obviate any sharp corners that would tend to injure grains of corn, or a person's hand manipulating the sheller.

The cylindrical sections 1 can be easily closed upon an ear of corn and the sheller moved back and forth or rotated upon the ear of corn to strip the ear of the grains thereof. It is optional to the user as to the manner in which the sheller is manipulated to remove grains from an ear of corn.

While in the drawings forming a part of this application there is illustrated the preferred embodiments of my invention, I would have it understood that the elements therein can be varied or changed without departing from the spirit of the invention.

Having now described my invention what I claim as new, is:—

1. A corn sheller comprising two semi-cylindrical sections having longitudinal flared edges, a longitudinal bolt pivotally connecting the opposite edges of said sections, and a plurality of staggeredly arranged inwardly extending semi-cylindrical projections struck from each of said sections.

2. A corn sheller comprising a pair of curved sections hinged together at one side and each having the marginal portion of its other side flaring, each of said sections furthermore provided with inwardly-extending semi-cylindrical projections struck from their respective section, the projections upon one section extending toward the projections of the other section.

3. A corn sheller comprising a pair of curved sections hinged together at one side and each having the marginal portion of its other side flaring, each of said sections furthermore provided with inwardly-extending semi-cylindrical projections struck from their respective section, the projections upon one section extending toward the projections of the other section, said projections of each section arranged in longitudinally-extending rows, with the projections of one row arranged staggeredly with respect to the projection of the other row.

In testimony whereof I affix my signature in the presence of two witnesses.

WILLIAM J. MOORE.

Witnesses:
MAX H. SROLOVITZ,
K. H. BUTLER.